United States Patent
Low et al.

(10) Patent No.: US 9,042,717 B2
(45) Date of Patent: May 26, 2015

(54) CAMERA SYSTEM WITH ROTATING MIRROR

(71) Applicant: Delphi Technologies, Inc., Troy, MI (US)

(72) Inventors: Yew Kwang Low, Singapore (SG); Kok Wee Yeo, Singapore (SG); Chee Keng Yeo, Singapore (SG); Ronald M. Taylor, Greentown, IN (US); Ward K. Everly, Kokomo, IN (US); William Garrison Shogren, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/955,725

(22) Filed: Jul. 31, 2013

(65) Prior Publication Data

US 2015/0037022 A1   Feb. 5, 2015

(51) Int. Cl.
| | |
|---|---|
| *G03B 35/00* | (2006.01) |
| *G03B 35/10* | (2006.01) |
| *H04N 3/08* | (2006.01) |
| *H04N 13/02* | (2006.01) |

(52) U.S. Cl.
CPC ............ *G03B 35/10* (2013.01); *H04N 3/08* (2013.01); *H04N 13/021* (2013.01); *H04N 13/0235* (2013.01)

(58) Field of Classification Search
USPC ............... 396/324, 331, 322; 352/60, 133
See application file for complete search history.

(56) References Cited

U.S. PATENT DOCUMENTS

| | | | |
|---|---|---|---|
| 4,758,093 A * | 7/1988 | Stern et al. | 356/608 |
| 4,963,962 A | 10/1990 | Kruegle et al. | |
| 5,999,278 A | 12/1999 | Suzuki et al. | |
| 6,335,758 B1 * | 1/2002 | Ochi et al. | 348/335 |
| 6,535,250 B1 | 3/2003 | Okisu et al. | |
| 7,034,272 B1 * | 4/2006 | Leonard et al. | 250/208.1 |
| 7,162,153 B2 * | 1/2007 | Harter et al. | 396/331 |
| 8,162,218 B2 * | 4/2012 | Meier et al. | 235/454 |
| 8,381,985 B2 | 2/2013 | Ferren et al. | |
| 2002/0027606 A1 * | 3/2002 | Yadid-Pecht | 348/298 |
| 2002/0154215 A1 | 10/2002 | Schechterman et al. | |
| 2003/0072570 A1 | 4/2003 | Seo | |
| 2004/0223077 A1 * | 11/2004 | Said et al. | 348/370 |
| 2008/0023551 A1 * | 1/2008 | Boehm et al. | 235/462.32 |
| 2013/0314311 A1 * | 11/2013 | Kuhlman et al. | 345/156 |

FOREIGN PATENT DOCUMENTS

EP     1 418 767 A2     5/2004

OTHER PUBLICATIONS

European Search Report dated Nov. 26, 2014.

* cited by examiner

*Primary Examiner* — Clayton E Laballe
*Assistant Examiner* — Warren K Fenwick
(74) *Attorney, Agent, or Firm* — Lawrence D. Hazelton

(57) ABSTRACT

An image system configured to record a scanned image of an area. The system includes a single two-dimensional (2D) imager and a rotatable mirror. The 2D imager is formed of a two-dimensional (2D) array of light detectors. The 2D imager is operable in a line-scan mode effective to individually sequence an activated line of light detectors at a time. The rotatable mirror is configured to rotate about an axis parallel to a plane defined by the rotatable mirror. The rotation is effective to vary an angle of the rotatable mirror to pan a projected image of the area across the 2D imager. The angle of the rotatable mirror and the activated line of the 2D imager are synchronized such that the scanned image recorded by the 2D imager is inverted with respect to the projected image.

2 Claims, 5 Drawing Sheets

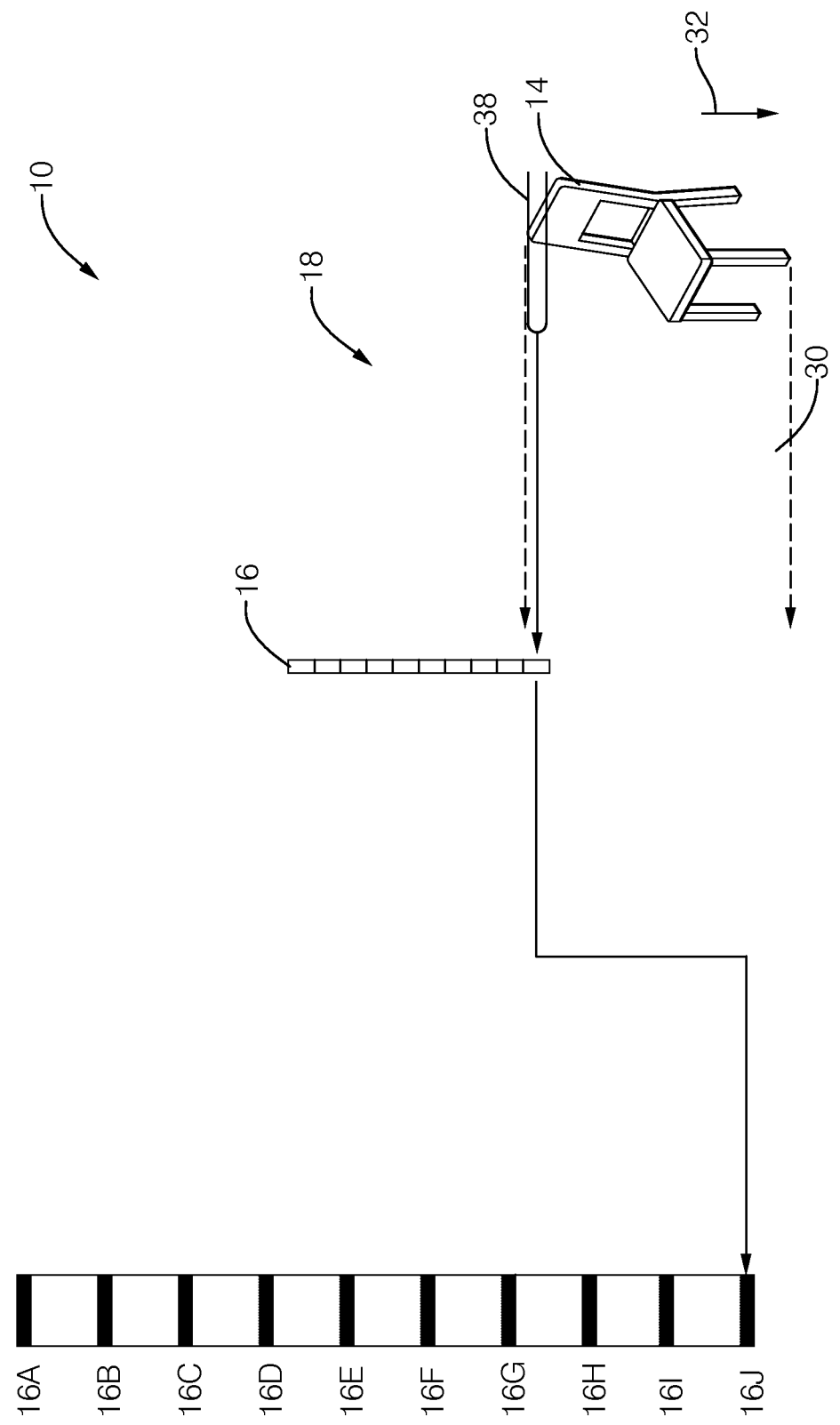

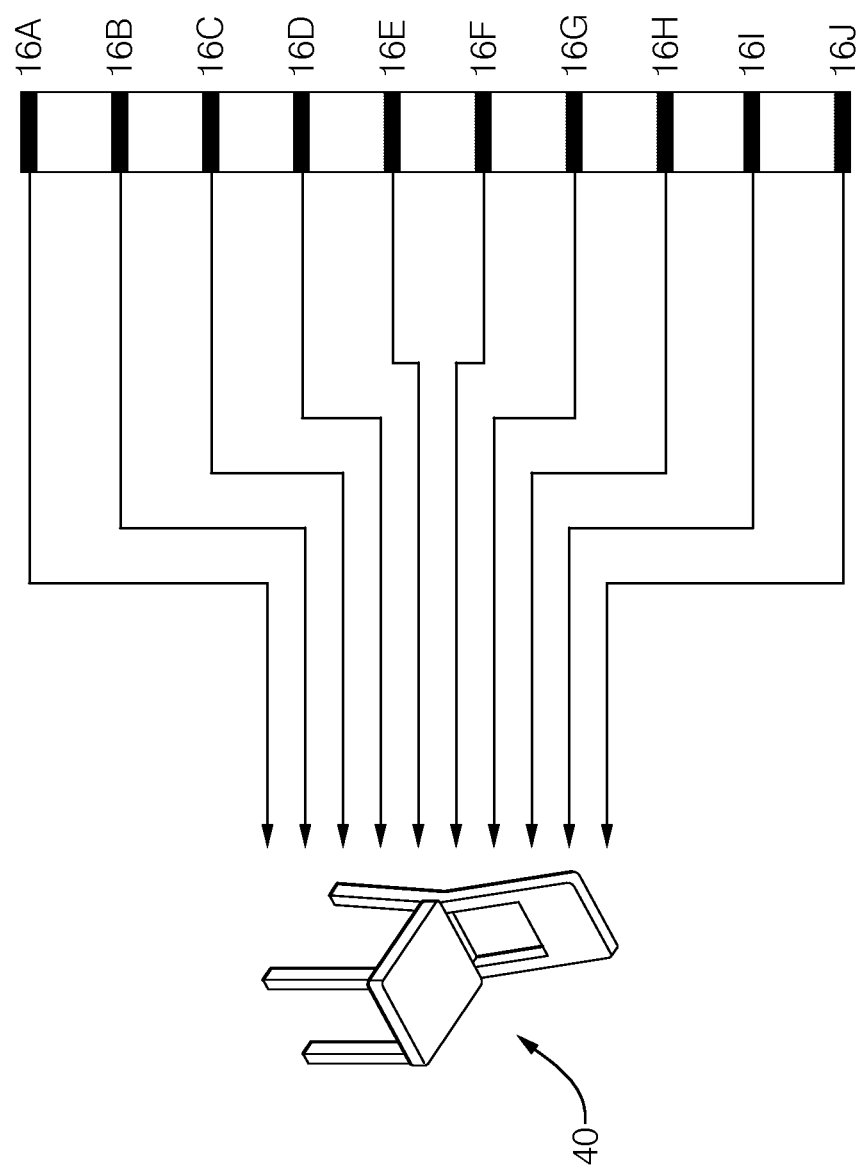

US 9,042,717 B2

CAMERA SYSTEM WITH ROTATING MIRROR

TECHNICAL FIELD OF INVENTION

This disclosure generally relates to a camera that uses a rotating mirror and a single two-dimensional (2D) imager, and more particularly relates to systems with a single 2D imager capable of multi-view, autostereoscopic, or three-dimensional (3D) image.

BACKGROUND OF INVENTION

Various configurations of multi-view or autostereoscopic cameras that use only one camera have been proposed. A configuration shown in U.S. Pat. No. 8,381,985 issued to Ferren et al. on Feb. 26, 2013 uses a beam splitter in conjunction with shutters to multiplex distinct images to a single camera. This configuration has the undesirable attribute that the beam splitter reduce by half the intensity of light received the camera. Another configuration shown in U.S. Pat. No. 7,181,136 to Perisic issued Feb. 20, 2007 uses mirrors to provide a split image to a single camera. This configuration has the undesirable attribute that each image (e.g. left half-image and right half-image) has half the resolutions of what would be available if the images were multiplexed to the single camera.

SUMMARY OF THE INVENTION

In accordance with one embodiment, an image system configured to record a scanned image of an area is provided. The system includes a single two-dimensional (2D) imager and a rotatable mirror. The 2D imager is formed of a two-dimensional (2D) array of light detectors. The 2D imager is operable in a line-scan mode effective to individually sequence an activated line of light detectors at a time. The rotatable mirror is configured to rotate about an axis parallel to a plane defined by the rotatable mirror. The rotation is effective to vary an angle of the rotatable mirror to pan a projected image of the area across the 2D imager. The angle of the rotatable mirror and the activated line of the 2D imager are synchronized such that the scanned image recorded by the 2D imager is inverted with respect to the projected image.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIGS. 2A, 2B, and 2C in combination illustrate how an image is captured by the system of FIG. 1 in accordance with one embodiment; and FIG. 3 is an illustration of an image captured by the system of FIG. 1 in accordance with one embodiment.

DETAILED DESCRIPTION

Figure 1:
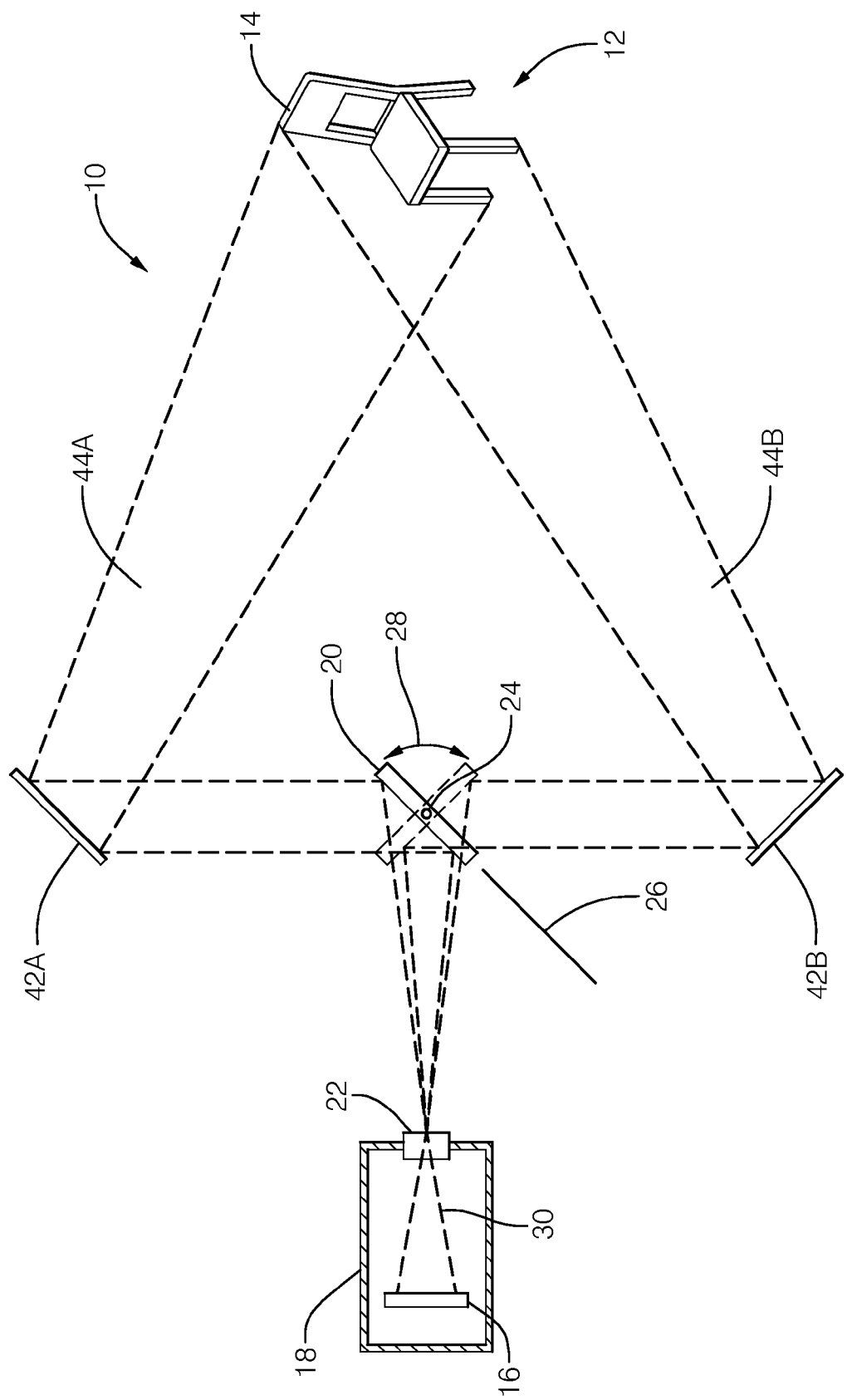
FIG. 1 is a diagram of an image system in accordance with one embodiment.

FIG. 1 illustrates a non-limiting example of an image system, hereafter referred to as the system 10. In general, the system 10 is configured to record a scanned image of an area 12 or an object 14, for example a chair that is viewed by the system 10. As used herein, a scanned image means that the image is captured by a two-dimensional (2D) imager 16 one line (row or column) of pixels at a time, or one pixel at a time. In general, the 2D imager 16 is formed of a two-dimensional array of light detectors, commonly referred to as pixels, as will be recognized by those in the art. Preferably, the 2D imager 16 is operable in a line-scan mode that is effective to individually sequence an activated line (row or column) of light detectors at a time. In other words, the 2D imager 16 should be capable of addressing/controlling single rows or columns of pixels of the array of pixels. It should be clear that the scanning technique described herein is distinct from the normal practice of using a 2D imager to capture all the pixels of the 2D imager at substantially the same instant, which is sometimes called global shutter imaging. The advantages of using this scanning technique in combination with the 2D imager 16 will become clear as the system 10 is described in more detail below. It should also be clear that the system 10 described herein is not comparable to systems using one-dimensional (1D) line scanners that consist of single line arrangement of light detectors. Typically, the 2D imager 16 will be part of a camera 18 that may include a lens assembly 22.

It will become apparent that the system 10 described herein is adaptable to multi-view applications such as auto-stereoscopic and three-dimensional (3D) image systems, or any image system that desires using a single camera or single 2D imager to capture images or the same object or area from multiple perspectives, or multiple independent or distinct images.

Continuing to refer to FIG. 1, the system 10 includes a rotatable mirror 20. The rotatable mirror 20 may be reflective on one side, or reflective on both sides, i.e. is one-sided or two-sided. The rotatable mirror 20 is generally configured to rotate about an axis 24 that is parallel to a plane 26 defined by the rotatable mirror 20. It should be recognized that as the rotatable mirror 20 rotates, the change in angle 28 causes a projected image 30 to pan or sweep across the 2D imager 16.

Figure 2A:
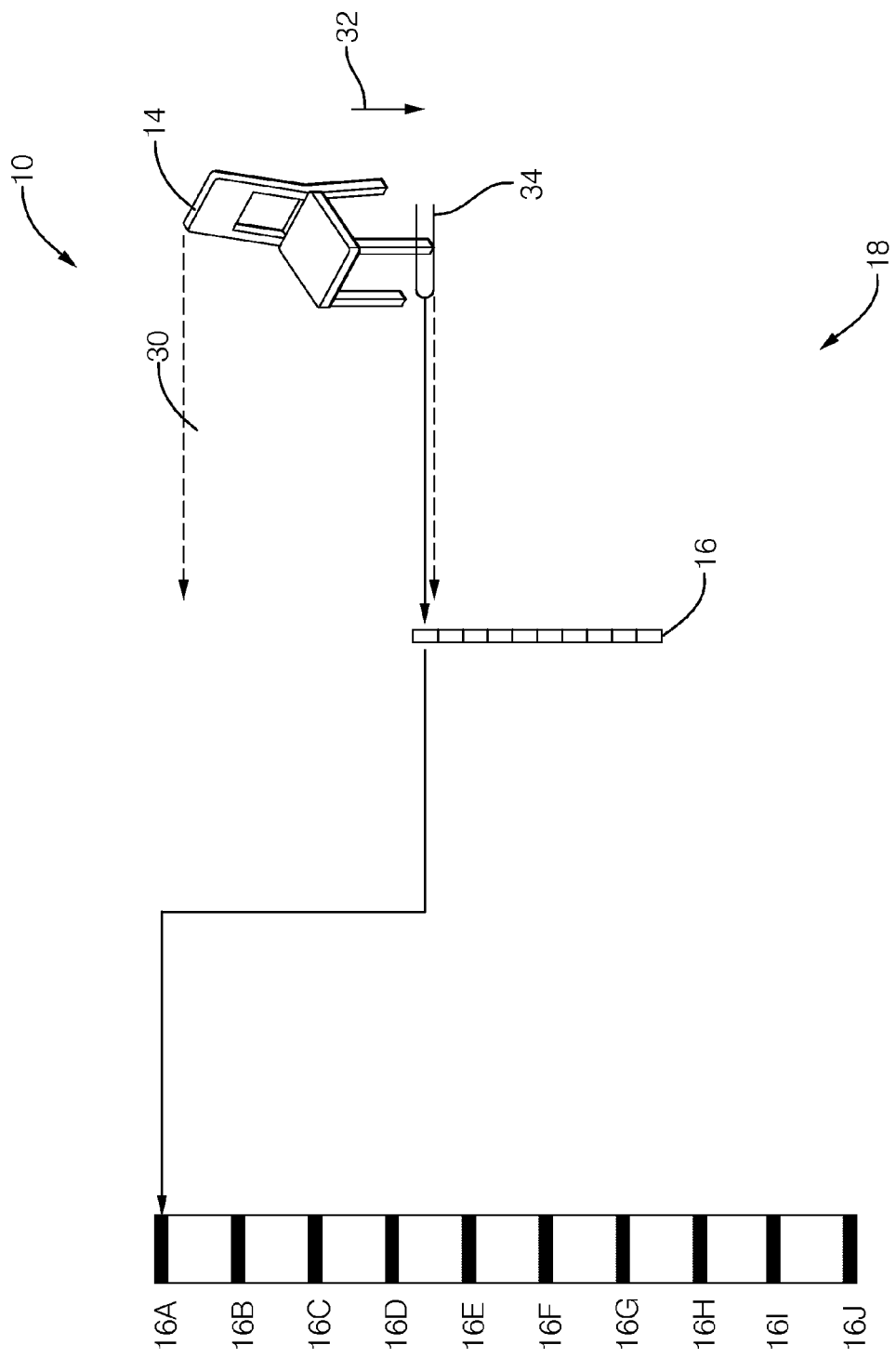
Figure 2B:
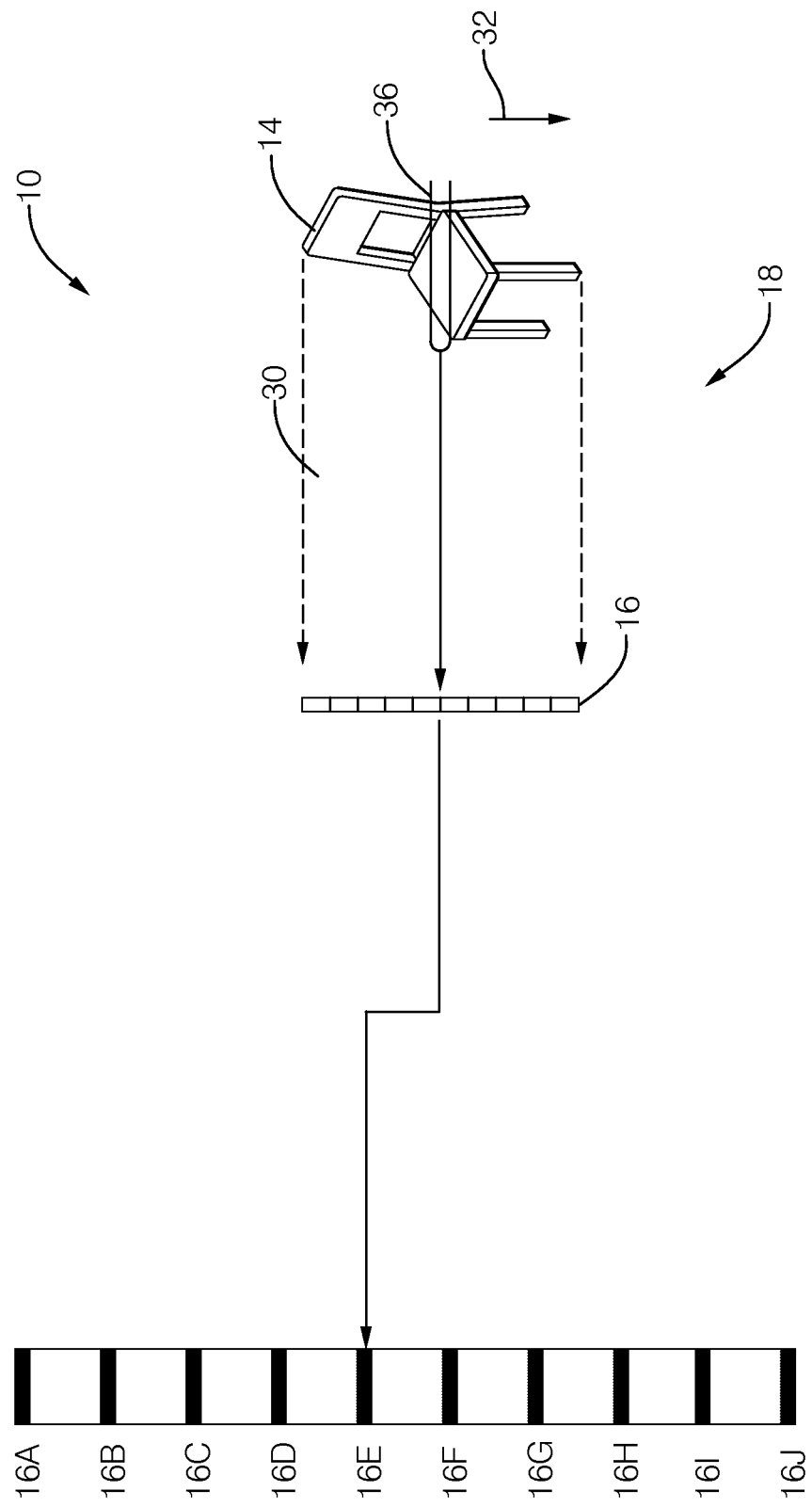

FIGS. 2A-2C illustrate a sequence of events that occur within the system 10 or the camera 18 as the rotatable mirror 20 (not shown) rotates and causes the projected image of the area 12 or object 14, in this example a chair, to pan across the 2D imager 16 in the direction shown by arrow 32. The rotatable mirror 20 is not shown only to simplify the illustration. It is recognized that the projected image 30 would sweep or pan across the 2D imager in an arc as suggested in FIG. 1, and is shown here as a parallel collimated image only to simplify the illustration. A column of array illustrations 16A-16J show a sequence of activated lines of light detectors that are activated on the 2D imager 16 as the projected image 30 pans across the 2D imager 16. The rotatable mirror 20 and the corresponding array illustration are synchronized based on the angle 28. It should be recognized that the illustration of the 2D imager 16 is a side view of the 2D imager, and that array illustrations 16A-16J show multiple iterations of a front view of the 2D imager. It should be appreciated that while the array illustrations 16A-16J suggest that the 2D imager 16 is a ten-by-ten (10×10) array of pixels, this is only for the purpose of simplifying the illustration. The actual 2D imager used can be of any commercially available size, 720×480 for example.

The system 10 may also include a controller (not shown) to coordinate the operation of the 2D imager 16 and the rotatable mirror 20. The controller may include a processor such as a microprocessor or other control circuitry as should be evident to those in the art. The controller may include memory, including non-volatile memory, such as electrically erasable programmable read-only memory (EEPROM) for storing one or more routines, thresholds and captured data. The one or more routines may be executed by the processor to perform steps for selecting which line (row or column) of the 2D imager 16 is activated based on the angle 28 of the rotatable mirror 20.

FIG. 2A illustrates the condition or event when the first or top line of light detectors is activated as illustrated by array illustration 16A. The position of projected image 30 of the object 14 relative to the 2D imager 16 is such that the top line of light detectors 'sees' or is able to detect light corresponding to a bottom slice or a first slice 34 of the object 14. In other words, if only the top line (row) of the 2D imager 16 is activated as suggested by array illustration 16A, then only an image corresponding to the first slice 34 is captured by the 2D imager 16.

FIG. 2B illustrates another event that occurs some time after that shown in FIG. 2A. The amount of time between events is determined by the rotational speed of the rotatable mirror 20. For this event the fifth line of light detectors is activated as illustrated by array illustration 16E. The position of projected image 30 of the object 14 relative to the 2D imager 16 is such that the fifth line of light detectors 'sees' or is able to detect light corresponding to an intermediate slice or a fifth slice 36 of the object 14.

FIG. 2C illustrates another event that occurs some time after that shown in FIG. 2B. For this event the tenth line of light detectors is activated as illustrated by array illustration 16J. The position of projected image 30 of the object 14 relative to the 2D imager 16 is such that the tenth line of light detectors 'sees' or is able to detect light corresponding to a top slice or a tenth slice 38 of the object 14.

It should be appreciated that illustrations (FIGS. 2A-2C) show only three of many events that occur within the camera 18. If every event were illustrated, there may be ten illustrations so show the position of the projected image 30 relative to the 2D imager 16 for each of the ten array illustrations 16A-16J. If the 2D array resolution was, for example, 720× 480, then there may be as many as four-hundred-eighty (480) events that occur while the projected image 30 pans across the 2D imager 16 instead of the ten events suggested by FIGS. 2A-2C. The patterns of light intensity recorded by each line (row) of light detectors may be temporarily held on the 2D imager 16, or corresponding data may be transferred to the controller (not shown) for storage.

FIG. 3 illustrates a scanned image 40 of the object 14 captured by the 2D imager 16 that is a result of this incremental line-by-line scanning of the projected image 30 while the projected image 30 is panned or swept across the 2D imager 16. Because the line-by-line scanning of the 2D array is synchronized to the angle 28, the scanned image 40 is inverted with respect to the projected image 30. If a higher resolution imager is considered, it should be evident that the scanned image 40 would be an accurate depiction of the projected image 30, other than being inverted. As such, the rotation of the rotatable mirror 20 is effective to vary the angle 28 of the rotatable mirror to pan a projected image of the area across the 2D imager, and the angle of the rotatable mirror, and the activated line of the 2D imager are synchronized such that the scanned image 40 recorded by the 2D imager is inverted with respect to the projected image 30.

Referring again to FIG. 1, the system 10, or the camera 18, may include one or more fixed mirror 42A, 42B, for example a first fixed mirror 42A arranged to cooperate with the rotatable mirror 20 to provide a first perspective view 44A of the area 12 and a second fixed mirror 42B arranged to cooperate with the rotatable mirror 20 to provide a second perspective view 44B of the area 12 distinct from the first perspective view 44A. This arrangement advantageously provides for an autostereoscopic or 3D imager system that needs only one camera 18. It is recognized that additional fixed or adjustable mirrors could be added to the system 10 to provide more than two perspective views of the area 12, or views of other areas distinct from the area 12.

It is also contemplated that the rotatable mirror 20 and fixed mirror(s) 42A and 42B could be integrated within the camera 18 interposed between the 2D imager 16 and lens assembly 22, where the lens assembly 22 may include a distinct objective lens for each perspective 44A, 44B. In this configuration, the size of the mirrors would likely be smaller and so could be advantageous from a cost integration perspective.

If the projected image 30 as formed from the lens assembly 22 is collimated or effectively collimated at the rotatable mirror 20, then the rotatable mirror 20 will displace the image of the object (as opposed to rotating in angle) and therefore can be used to image and present multiple contiguous lines (or columns) to the imager at the same time. This has the advantage of allowing longer imager integration times to be used without image smear since the displacement of the image in the collimated space due to the rotating mirror movement is much smaller compared to the displacement of the object in object space.

It is anticipated that the use of a rotating mirror with a 2D imager 16 eliminates the need for the 2D imager 16 and/or lens assembly 22 to also rotate or move in sequence with the panned image motion of the projected image 30 produced by the rotatable mirror 20 compared to, for example, a 1D imager array. This greatly simplifies the complexity (e.g. the mass and size of a lens and mirror or an imager and mirror combination) and reduces cost.

Since the rotatable mirror 20 is reflecting a portion of the image plane at a time and in panning the projected image 30 uses a shifting or moving area of the mirror, multiple views to other imagers can also be considered on each side of the rotatable mirror 20.

It is also contemplated that 2D imagers sensitive in the visible, near-infrared or other wavelengths can be used to accomplish multi-view, autostereoscopic or 3D imaging in a variety of wavelength bands given that the rotatable mirror 20 can be readily coated to reflect visible and/or near-infrared light or other combinations of wavelengths as is understood by those versed in the art.

Operating the 2D imager 16 array synchronized with the movement of the rotatable mirror 20 eliminates several error and signal losses that occurs with a 1D array or line scan camera. Some of the limitations of using a 1D array and a rotating image and are known to those well versed in the art are: 1) Jitter error caused by the overscan or underscan (i.e. misalignment of the mirror rotated image position to the actual position of the 1D line imager); 2) distortions at both edges of the scanned area (called the "bow-tie effect" from the shape of the distorted image) due to the angular deviation of the rotated image to the plane of the imager relative to the rotation axis; and 3) temporal signal loss due to the 1D line array using the same collection and readout circuitry in a serial fashion with a reset time needed for each line while the 2D imager array circuitry integrates the light collection and readout process on all rows or columns simultaneously.

Accordingly, an image system (the system 10) that uses a 2D imager 16 and a rotatable mirror 20 to capture scanned images of an area 12 is provided. The system provides a means for capturing autostereoscopic or 3D images using a 2D imager 16.

While this invention has been described in terms of the preferred embodiments thereof, it is not intended to be so limited, but rather only to the extent set forth in the claims that follow.

We claim:

1. An image system configured to record a scanned image of an area, said system comprising:
   a single two-dimensional (2D) imager formed of a two-dimensional (2D) array of light detectors, wherein the 2D imager is operable in a line-scan mode effective to individually sequence an activated line of light detectors at a time; and
   a rotatable mirror configured to rotate about an axis parallel to a plane defined by the rotatable mirror, said rotation effective to vary an angle of the rotatable mirror to pan a projected image of the area across the 2D imager, wherein the angle of the rotatable mirror and the activated line of the 2D imager are synchronized such that the scanned image recorded by the 2D imager is inverted with respect to the projected image.

2. The system in accordance with claim 1, wherein the camera includes one or more fixed mirror arranged to cooperate with the rotatable mirror to provide a first perspective view of the area and a second perspective view of the area distinct from the first perspective view.

* * * * *